United States Patent
Yang

(10) Patent No.: US 9,948,847 B2
(45) Date of Patent: Apr. 17, 2018

(54) WEARABLE DEVICE, PHOTOGRAPHY DEVICE AND ASSOCIATED PHOTOGRAPHING METHOD

(71) Applicant: Huizhou TCL Mobile Communication Co., Ltd., Huizhou, Guangdong (CN)

(72) Inventor: Yan Yang, Guangdong (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 53 days.

(21) Appl. No.: 14/902,055

(22) PCT Filed: Jan. 15, 2015

(86) PCT No.: PCT/CN2015/070763
§ 371 (c)(1),
(2) Date: Dec. 30, 2015

(87) PCT Pub. No.: WO2016/070497
PCT Pub. Date: May 12, 2016

(65) Prior Publication Data
US 2016/0309072 A1  Oct. 20, 2016

(30) Foreign Application Priority Data
Nov. 5, 2014  (CN) .......................... 2014 1 0621134

(51) Int. Cl.
| | |
|---|---|
| *H04N 5/232* | (2006.01) |
| *H04W 76/14* | (2018.01) |
| *H04W 4/80* | (2018.01) |
| *H04W 4/00* | (2018.01) |
| *H04W 76/02* | (2009.01) |

(52) U.S. Cl.
CPC ..... *H04N 5/23206* (2013.01); *H04N 5/23293* (2013.01); *H04W 4/008* (2013.01);
(Continued)

(58) Field of Classification Search
CPC .......... H04N 5/23203; H04N 5/23219; H04N 5/23216; H04N 1/00315; H04N 1/00411;
(Continued)

(56) References Cited

U.S. PATENT DOCUMENTS 4,542,970 A * 9/1985 Suzuki .................. G03B 17/40
396/264
6,359,837 B1 * 3/2002 Tsukamoto ............ G03B 17/24
368/10
(Continued)

FOREIGN PATENT DOCUMENTS

| CN | 101771750 A | 7/2010 |
|---|---|---|
| CN | 103051840 A | 4/2013 |

(Continued)

*Primary Examiner* — Nelson D. Hernández Hernández
(74) *Attorney, Agent, or Firm* — Andrew C. Cheng

(57) ABSTRACT

A photography device, a wearable device, a photography system and an associated photographing method are provided. The method includes the following steps: establishing a wireless connection between the photography device and the wearable device; transmitting, wirelessly, a preview image captured by the photography device to the wearable device; displaying by the wearable device the received preview image to the user; transmitting a user control command received by the wearable device to the photography device through the wireless connection; performing, by the photography device, an associated operation according to the user control command. By the above means, the present disclosure can photograph an image that can meet the user's requirements, and thus enhance the user experience.

7 Claims, 2 Drawing Sheets

(52) U.S. Cl.
CPC ........... *H04W 4/80* (2018.02); *H04W 76/023* (2013.01); *H04W 76/14* (2018.02)

(58) Field of Classification Search
CPC ........ G08B 13/19684; G08B 13/19689; G03B 3/12
USPC ........ 348/211.99, 211.1, 211.2, 211.8, 211.9
See application file for complete search history.

(56) References Cited

U.S. PATENT DOCUMENTS

| | | |
|---|---|---|
| 8,397,167 B2 | 3/2013 | West et al. |
| 2002/0154221 A1* | 10/2002 | Ishimaru .............. H04N 1/0001 348/207.1 |
| 2012/0021829 A1* | 1/2012 | Shoham ................ A63F 13/332 463/31 |
| 2013/0235222 A1* | 9/2013 | Karn .................. H04N 5/23203 348/211.2 |
| 2014/0267742 A1 | 9/2014 | Tapia et al. |
| 2015/0319353 A1* | 11/2015 | Kaneda .............. H04N 5/23206 348/211.2 |
| 2016/0088230 A1* | 3/2016 | Flores ................ H04N 5/23203 348/211.4 |

FOREIGN PATENT DOCUMENTS

| | | | |
|---|---|---|---|
| CN | 103458189 A | 12/2013 | |
| CN | 103905702 A | 7/2014 | |
| CN | 103916602 A | 7/2014 | |
| CN | 104092945 A | 10/2014 | |
| WO | WO 2014065127 A1 * | 5/2014 | ......... H04N 5/23206 |

\* cited by examiner

WEARABLE DEVICE, PHOTOGRAPHY DEVICE AND ASSOCIATED PHOTOGRAPHING METHOD

FIELD OF THE DISCLOSURE

The present disclosure relates to the field of photography technologies, and more particularly, to a wearable device, a photography device and an associated photography method.

BACKGROUND OF THE DISCLOSURE

In people's lives, they would often experience wonderful and memorable sceneries or locations, which may be recorded by photographs or videos. In the prior art, however, when asking for others' favor to take oneself a photo or to record a video, he/she cannot preview the photo effects, thus causing the resultant photos or videos to be unsatisfactory.

Therefore, a technical solution would be needed to address the aforementioned problem.

SUMMARY OF THE DISCLOSURE

A primary technical issue to be solved by the present disclosure is to provide a wearable device, a photography device, a photography system and an associated photography method, which can enable photo preview and thus ensure the photo effects.

To solve the above technical issue, a technical solution adopted by the present disclosure follows as below: to provide a photography device, comprising a wireless communication module, a photography assembly and a control module. The wireless communication module is configured to establish a wireless connection between the photography device and a wearable device. The control module is configured to control the wireless communication module to transmit a preview image captured by the photography assembly to the wearable device, where the preview image is transmitted as thumbnails frame by frame by the wireless communication module to the wearable device, so as to enable the wearable device to display the received preview image to a user; the wireless communication module is further configured to receive a user control command transmitted by the wearable device, and the control module controls the photography assembly to perform an associated operation according to the user control command; the user control command may include a photographing command or a photography parameters adjustment command, the control module controls the photography assembly to photograph according to the photographing command to capture a still image, or to control the photography assembly to adjust the parameters according to the photography parameters adjustment command to re-capture a preview image with the adjusted parameters.

The control module may control the wireless communication module to transmit the still image to the wearable device, so as to enable the wearable device to display the received still image to the user.

To solve the aforementioned technical issue, another technical solution adopted by the present disclosure follows as below: to provide a photography method of a photography system, the photography system including a photography device and a wearable device. The method includes the following steps: establishing a wireless connection between the photography device and the wearable device; transmitting, wirelessly, a preview image captured by the photography device to the wearable device; displaying by the wearable device the received preview image to a user; transmitting a user control command received by the wearable device to the photography device through the wireless connection; performing, by the photography device, an associated operation according to the user control command.

The step of transmitting, wirelessly, the preview image captured by the photography device to the wearable device may include: transmitting the preview image as thumbnails frame by frame to the wearable device.

The user control command may include a photographing command or a photography parameters adjustment command; the step of performing, by the photography device, an associated operation according to the user control command may include:

photographing by the photography device according to the photographing command to capture a still image, or adjusting by the photography device the parameters according to the photography parameters adjustment command to re-capture a preview image with the adjusted parameters.

The method may further include: if the photography device captures the still image, then transmitting by the photography device the still image to the wearable device via the wireless connection; displaying by the wearable device the received still image to the user, and returning to the step of transmitting the user control command received by the wearable device to the photography device via the wireless connection; if the photography device re-captures the preview image with the adjusted parameters, then returning to the step of transmitting the preview image captured by the photography device to the wearable device via the wireless connection.

To solve the aforementioned technical issue, yet another technical solution adopted by the present disclosure follows as below: to provide a wearable device, comprising a wireless communication module, a display module, an input module and a control module. The wireless communication module is configured to establish a wireless connection between the wearable device and a photography device. The control module controls the display module to display to a user a received preview image. The input module is provided for the user to input a user control command. The control module further controls the wireless communication module to transmit the user control command to the photography device via the wireless connection to enable the photography device to control a photography assembly to perform an associated operation according to the user control command.

The user control command may include a photographing command or a photography parameters adjustment command. The photography device may photograph according to the photographing command so as to capture a still image, or adjust the parameters according to the photography parameters adjustment command to re-capture a preview image with the adjusted parameters; if the photography device captures the still image, then the wireless communication module of the wearable device receives the still image transmitted by the photography device via the wireless connection, the control module of the wearable device controls the display module to display to the user the received still image, and the wireless communication module of the wearable device transmits the user control command to the photography device via the wireless connection; if the photography device re-captures the preview image with the adjusted parameters, then the wireless communication module of the wearable device receives the preview image transmitted by the photography device via the wireless connection, the control module of the wearable device controls the display module to display to the user the received preview image, and the wireless communication module transmits the user control command to the photography device via the wireless connection.

To solve the aforementioned technical issue, still another technical solution adopted by the present disclosure follows as below: to provide a photography system, comprising a photography device and a wearable device. The photography device includes a wireless communication module, a photography assembly and a control module. The wireless communication module of the photography device is configured to establish a wireless connection between the photography device and the wearable device. The control module of the photography device controls the wireless communication module of the photography device to transmit a preview image captured by the photography assembly to the wearable device to enable the wearable device to display to the user the received preview image; the wireless communication module of the photography device may further receive a user control command transmitted by the wearable device, and the control module of the photography device may control the photography assembly to perform an associated operation according to the user control command; the wearable device may include a wireless communication module, a display module, an input module and a control module. The wireless communication module of the wearable device is configured to establish a wireless connection between the wearable device and the photography device. The control module of the wearable device controls the display module to display to the user the received preview image. The input module is provided for the user to input the user control command. The wireless communication module of the wearable device may transmit the user control command to the photography device via the wireless connection to enable the photography device to perform an associated operation according to the user control command.

The user control command may include a photographing command or a photography parameters adjustment command. The control module of the photography device may control the photography assembly to photograph according to the photographing command so as to capture a still image, or control the photography assembly to adjust the parameters according to the photography parameters adjustment command in order to re-capture a preview image with the adjusted parameters.

The control module of the photography device may control the wireless communication module to transmit the still image to the wearable device, so as to enable the wearable device to display the received still image to the user.

The user control command may include a photographing command or a photography parameters adjustment command. The photography device may photograph according to the photographing command so as to capture a still image, or adjust the parameters according to the photography parameters adjustment command in order to re-capture a preview image with the adjusted parameters.

If the photography device captures the still image, then the wireless communication module of the wearable device may receive the still image transmitted by the photography device via the wireless connection. The control module of the wearable device may control the display module to display to the user the received still image, and the wireless communication module of the wearable device may transmit the user control command to the photography device.

If the photography device re-captures the preview image with the adjusted parameters, then the wireless communication module of the wearable device may receive the preview image transmitted by the photography device via the wireless connection. The control module of the wearable device may control the display module to display to the user the received preview image, and the wireless communication module of the wearable device may transmit the user control command to the photography device.

Beneficial effects of the present disclosure follows as below: differing from the prior art, in the photography process of the present disclosure, a preview image captured by the photography device is transmitted to the wearable device via the wireless connection, and the wearable device displays the received preview image to the user and a user control command received by the wearable device is transmitted to the photography device via the wireless connection, and finally, the photography device performs an associated operation according to the user control command. As such, the user can check the image in advance so as to ensure that the resultant photograph can meet the user's requirements, thus enabling convenient operations and enhancing the user experience.

DETAILED DESCRIPTION OF THE DISCLOSURE

Figure 1:
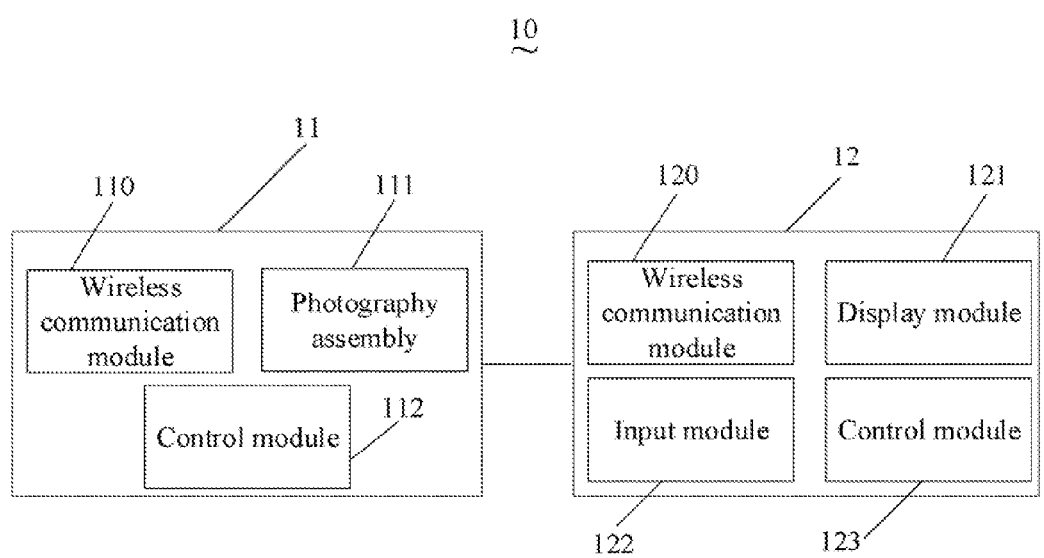
FIG. 1 is a block diagram of a photography system according to an embodiment of the present disclosure.

Referring now to FIG. 1, a block diagram of a photography system according to an embodiment of the present disclosure is shown. The photography system 10 of the present disclosure comprises a photography device 11 and a wearable device 12, as is shown in FIG. 1. The photography device 11 may be photograph equipment, and may also be video recording equipment, for example, a mobile phone, a still camera or a video camera. The wearable device 12 is a general term for devices wearable, developed by application of wearable technologies to create intelligent designs of everyday wearables such as, for example, glasses, gloves, a watch, clothing, shoes, etc. The wearable device 12 according to the present disclosure is preferably the equipment that can be easily seen by the user, for example, a watch or clothes.

In this embodiment, the photography device 11 comprises a wireless communication module 110, a photography assembly 11 and a control module 112. The wearable device 12 comprises a wireless communication module 120, a display module 121, an input module 122 and a control module 123.

The wireless communication modules 110 and 120 are configured to establish a wireless connection between the photography device 11 and the wearable device 12. The wireless connection may include Bluetooth connection, infrared connection or other wireless connections. Therefore, the wireless communication modules 110 and 120 may be Bluetooth modules or infrared devices, etc.

Only when the wireless connection is set up, can the photography device 11 and the wearable device 12 keep synchronized preview in the subsequent image preview, so as to timely provide the preview image to the user, and thus ensure the consistency between the preview image and current state of the user. Hence, the control module 112 of the photography device 11 may first detect whether the wireless connection between the photography device 11 and the wearable device 12 is intact. More specifically, the wireless communication module 110 can be controlled to send a confirmation request to the wearable device 12. If the wireless communication module 110 receives a confirmation message from the wireless communication module 120 of the wearable device 12, then it can be determined that the wireless connection between the photography device 11 and the wearable device 12 is intact. And the following photography processes can be carried out. If the wireless communication module 110 doesn't receive the confirmation message responded from the wireless communication module 120, then it can be determined that the wireless connection between the photography device 11 and the wearable device 12 is not completed, and the user will be prompted with the same. Or, the photography assembly 111 may be controlled to prompt another user to photograph or to perform the photographing operation within a preset time.

When the control module 112 of the photography device 11 determines that the wireless connection is established between the photography device 11 and the wearable device 12, the photography assembly 111 will be controlled to be activated to take a photograph of the preview interface, so as to obtain a preview image. Furthermore, the wireless communication module 110 may be controlled to transmit the preview image obtained by the photography assembly 111 to the wearable device 12 via the wireless connection.

The wireless communication module 120 of the wearable device 12 may receive the preview image. The control module 123 may control the display module 121 to display to the user the received preview image. And the input module 122 is provided to the user for inputting a user control command. The control module 123 may further control the wireless communication module 120 to transmit the user control command to the photography device 11 via the wireless connection. The photography device 11 may control the wireless communication module 110 to receive the user control command transmitted by the wearable device 12. The control module 112 may control the photography assembly 111 to perform an associated operation according to the user control command.

In this embodiment, therefore, the user can check the preview image before photographing by the photography device 11, thus ensuring that the resultant image can meet the user's requirements.

In this embodiment, the user control command may include a photographing command or a photography parameters adjustment command. The control module 112 of the photography device 11 may control the photography assembly 111 to photograph according to the photographing command so as to capture a still image, or control the photography assembly 111 to adjust the parameters according to the photography parameters adjustment command in order to re-capture a preview image with the adjusted parameters.

Namely, when the user checks the preview image and is satisfied with the same, the user may enter a photographing command via the input module 122, and the control module 123 may control the wireless communication module 120 to transmit the photographing command to the photography device 11. When the wireless communication module 110 of the photography device 11 receives the photographing command, the control module 112 may control the photography assembly 111 to photograph according to the photographing command so as to acquire a still image.

When the user checks the preview image and is not satisfied with the same, the user may enter a photography parameters adjustment command via the input module 122, and the control module 123 may control the wireless communication module 120 to transmit the photography parameters adjustment command to the photography device 11. When the wireless communication module 110 of the photography device 11 receives the photography parameters adjustment command, the control module 112 may control the photography assembly 111 to adjust the parameters according to the photography parameters adjustment command so as to re-capture a preview image. Furthermore, the control module 112 may further control the wireless communication module 110 to transmit the re-captured preview image to the wearable device 12 via the wireless connection.

After the wireless communication module 120 of the wearable device 12 receives the re-captured preview image, the control module 123 may further control the display module 121 to display to the user the received preview image, and further control the wireless communication module 120 to transmit the user control command to the photography device 11 via the wireless connection. The above processes would be repeated until the user is satisfied with the preview image.

The preview image may be transmitted in the form of thumbnails frame by frame. More specifically, when a preview image is captured, the control module 112 may first compress the preview image to produce a thumbnail, and then control the wireless communication module 110 to transmit the thumbnail. If the wireless communication module 110 receives the parameters adjustment command entered by the user, the photography assembly 111 may re-capture a next frame preview image with the adjusted parameters and transmit the same.

The parameters adjustment may include adjustment of distance or adjustment of light intensity.

In this embodiment, that the control module 112 controls the photography assembly 111 to photograph according to the photographing command may specifically comprise: the control module 112 first controls the photography assembly 111 to prompt another user (photographer) to take a photograph to acquire a still image. If a manual photographing action is not received within the preset time, then the photography assembly 111 will be controlled to photograph automatically so as to obtain the still image. The preset time is preferably 5 seconds. As such, another user may photograph manually, and meanwhile, the self-timer function can also be realized when there is not another user.

When the still image is captured, the control module 112 of the photography device 11 may further control the wireless communication module 110 to transmit the still image to the wearable device 12. The wireless communication module 120 of the wearable device 12 may receive the still image. The control module 123 may control the display module 121 to display to the user the received still image, and further control the wireless communication module 120 to transmit to the photography device 11 via the wireless connection a user control command entered by the user after checking the still image.

The user control command entered by the user after checking the still image may comprise a photography parameters adjustment command or a photographing completion command.

More specifically, if the user checks the still image and is satisfied with the same, then the photographing completion command may be entered through the input module 122. And the control module 123 may control the wireless communication module 120 to transmit the photographing completion command to the photography device 11 via the wireless connection. When the wireless communication module 110 of the photography device 11 receives the photographing completion command, the control module 112 may control the photography assembly 111 to end the operation of photographing the current image. Specifically, the photography assembly 111 may be controlled to deactivate the photograph function, or to prompt another user to photograph a next image.

If the user checks the still image and is not satisfied with the same, then a photography parameters adjustment command may be entered through the input module 122. And the control module 123 may control the wireless communication module 120 to transmit the photography parameters adjustment command to the photography device 11 via the wireless connection. When the wireless communication module 110 of the photography device 11 receives the photography parameters adjustment command, the control module 112 may control the photography assembly 111 to adjust the parameters according to the photography parameters adjustment command so as to re-capture a preview image. Further, the preview image may be transmitted to the wearable device 12 by the wireless communication module 110. The above processes will be repeated until the user feels satisfied with the still image taken or the user autonomously cancels the photography operation, then the operation will be ended.

The above being said, in this embodiment, the preview image and the still image will be transmitted to the user for checking, if the user is not satisfied with the same, then the photo will be taken another time, thus ensuring that the final image can meet the user's requirements.

Figure 2:
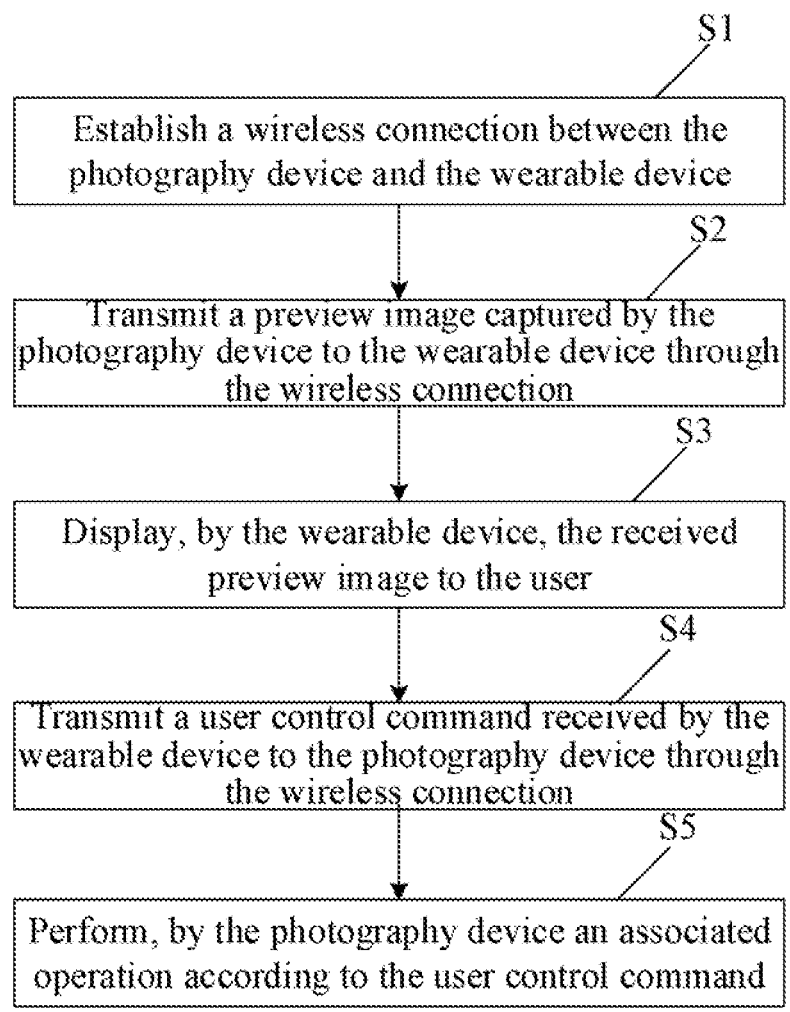
FIG. 2 is a flow chart illustrating a photography method of a photography system according to an embodiment of the present disclosure.

This embodiment also provides a photography method of a photography system based on the aforementioned photography system. Referring now to FIG. 2 for more details.

The photography method of the photography system according to this embodiment comprises the following steps, as is shown in FIG. 2:

Step S1: establishing a wireless connection between the photography device and the wearable device.

In this step, the photography device may further detect whether the wireless connection is intact, the specific detection process is depicted as above, which won't be given details herein.

Step S2: transmitting a preview image captured by the photography device to the wearable device via the wireless connection.

Specifically, the preview image is transmitted to the wearable device in the form of thumbnails.

This step includes, in particular, that the photography device first turns on the photography preview interface in order to capture a preview image. Furthermore, the received preview image may be compressed to produce a thumbnail, which may be transmitted to the wearable device via the wireless connection.

Step S3: displaying by the wearable device to the user the received preview image.

Step S4: transmitting a user control command received by the wearable device to the photography device via the wireless connection.

The user control command may comprise a photographing command or a photography parameters adjustment command.

The parameters adjustment may include adjustment of distance or adjustment of light intensity.

The present embodiment comprises the following in particular: when the user checks the preview image and feels satisfied with the same, then the user may input a photographing command; if the user checks the preview image and is not satisfied with the same, then the user may input a photography parameters adjustment command.

Step S5: performing by the photography device an associated operation according to the user control command.

In the step S4, if the user control command entered by the user is a parameters adjustment command, then the photography device may adjust the parameters according to the photography parameters adjustment command, in order to re-capture a preview image with the adjusted parameters. Further, the photography device may transmit the re-captured preview image to the wearable device via the wireless connection.

The wearable device may receive the re-captured preview image, and display to the user the received preview image, and further transmit the user control command to the photography device via the wireless connection. The above processes would be repeated until the user is satisfied with the preview image.

The preview image may be transmitted in the form of thumbnails frame by frame. Specifically, as previously described, when the preview image is captured in the step S2, the preview image will first be compressed to produce a thumbnail, which may then be transmitted to the wearable device. If the parameters adjustment command entered by the user is received, then the photography device may re-capture the next frame preview image with the adjusted parameters and transmit the same.

If the user control command entered by the user in the step S4 is a photographing command, the photography device may photograph according to the photographing command so as to obtain a still image.

The photographing method according to the photographing command may specifically comprise: first prompting another user (photographer) to photograph so as to obtain the still image, if a manual photographing action is not received within the preset time, then the photography assembly may photograph automatically so as to obtain the still image, where the preset time is preferably 5 seconds. As such, another user may photograph manually, and meanwhile, the self-timer function can also be realized when there is not another user.

The photography device may, if obtaining the still image, transmit the still image to the wearable device via the wireless connection, so as to enable the wearable device to display the received still image to the user, and transmit back to the photography device the user control command entered by the user after checking the still image.

The user control command entered by the user after checking the still image may include a photography parameters adjustment command or a photography completion command.

More specifically, if the user checks the still image and is satisfied with the same, then the photographing completion command may be entered. The wearable device may transmit the photographing completion command to the photography device via the wireless connection. The photography device may, after receiving the photographing completion command, end the operation of photographing the current image. Specifically, the photography function may be deactivated, or another user may be prompted to photograph a next image.

If the user checks the still image and is not satisfied with the same, then the photography parameters adjustment command may be entered. The wearable device may transmit the photography parameters adjustment command to the photography device via the wireless connection. The photography device may, after receiving the photography parameters adjustment command, adjust the parameters according to the photography parameters adjustment command, so as to re-capture a preview image with the adjusted parameters, and transmit the preview image to the wearable device. The above processes will be repeated until the user feels satisfied with the still image taken or the user autonomously cancels the photographing operation, which then will be ended.

As is stated above, before photographing, the preview image or still image will be transmitted to the user to check, and the user chooses the operation of photographing or re-photographing, thus ensuring that the final image taken can meet the user's requirements and thereby enhancing the user experience.

What is described above is merely embodiments of the present disclosure, thus shouldn't be construed to be limiting the patent scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A photographing method of a photography system, the photography system comprising a photography device and a wearable device, the method comprising the following steps:
   establishing a wireless connection between the photography device and the wearable device, and determining whether the wireless connection between the photography device and the wearable device is intact when the photography device captures a preview image;
   transmitting the preview image captured by the photography device to the wearable device via the wireless connection;
   displaying by the wearable device to a user the received preview image;
   transmitting a user control command received by the wearable device to the photography device via the wireless connection; and
   performing by the photography device an associated operation according to the user control command;
   wherein the user control command comprises a photographing command, and the step of performing by the photography device the associated operation according to the user control command comprises:
   setting a preset time, and first prompting another user (photographer) to manually take a photograph to acquire a still image within the preset time; and
   taking the photograph automatically when no manual photographing action is received within the preset time.

2. The photographing method according to claim 1, wherein the step of transmitting the preview image captured by the photography device to the wearable device via the wireless connection comprises:
   transmitting to the wearable device the preview image in the form of thumbnails frame by frame.

3. The photographing method according to claim 1, wherein the preset time is 5 seconds.

4. The photographing method according to claim 1, further comprising:
   capturing by the photography device the still image and transmitting the still image to the wearable device via the wireless connection; and
   displaying by the wearable device to the user the received still image, and returning to the step of transmitting the user-control command received by the wearable device to the photography device via the wireless connection.

5. The photographing method according to claim 1, wherein the user control command comprises a photography parameters adjustment command, and the step of performing by the photography device the associated operation according to the user control command comprises:
   adjusting by the photography device parameters according to the photography parameters adjustment command to re-capture the preview image with adjusted parameters.

6. The photographing method according to claim 5, further comprising:
   re-capturing by the photography device the preview image with the adjusted parameters, and returning to the step of transmitting the preview image captured by the photography device to the wearable device via the wireless connection.

7. The photographing method according to claim 1, wherein the determining whether the wireless connection between the photography device and the wearable device is intact comprises:
   transmitting by the photography device a confirmation request to the wearable device;
   when the photography device receives a confirmation message from the wearable device, the wireless connection is determined to be intact; and
   when the photography device doesn't receive the confirmation message from the wearable device, the wireless connection is determined to be not intact.

* * * * *